United States Patent
Witonis et al.

(10) Patent No.: US 8,449,427 B2
(45) Date of Patent: May 28, 2013

(54) SEQUENTIAL PLANETARY STACK TRANSMISSION SYSTEM

(75) Inventors: Michael Witonis, Brighton, MA (US); Jay Seiter, Boston, MA (US); Morgan Misek, Jamaica Plain, MA (US); Joshua Filgate, Boylston, MA (US); Jesse Kuhn, Somerville, MA (US)

(73) Assignee: Northeastern University, Boston, MA (US)

( * ) Notice: Subject to any disclaimer, the term of this patent is extended or adjusted under 35 U.S.C. 154(b) by 220 days.

(21) Appl. No.: 12/745,841

(22) PCT Filed: Dec. 3, 2008

(86) PCT No.: PCT/US2008/085372
§ 371 (c)(1),
(2), (4) Date: Aug. 11, 2010

(87) PCT Pub. No.: WO2009/073705
PCT Pub. Date: Jun. 11, 2009

(65) Prior Publication Data
US 2010/0298084 A1   Nov. 25, 2010

Related U.S. Application Data

(60) Provisional application No. 61/005,136, filed on Dec. 3, 2007.

(51) Int. Cl.
*F16H 3/44* (2006.01)
(52) U.S. Cl.
USPC .......................................................... 475/269
(58) Field of Classification Search
USPC ........................................ 475/269, 270, 275
See application file for complete search history.

(56) References Cited

U.S. PATENT DOCUMENTS

| | | | |
|---|---|---|---|
| 4,052,912 A | 10/1977 | Vukelic | |
| 5,121,936 A | 6/1992 | Cowan | |
| 5,273,500 A | 12/1993 | Nagano | |
| 6,142,904 A | 11/2000 | Yoo | |
| 6,223,613 B1 | 5/2001 | Martin | |
| 6,379,276 B1 | 4/2002 | Cheng | |
| 6,852,060 B1 * | 2/2005 | Ash | 475/296 |
| 7,083,542 B2 * | 8/2006 | Itou et al. | 475/297 |
| 2002/0183159 A1 * | 12/2002 | Okochi | 475/269 |
| 2006/0117884 A1 | 6/2006 | Quinn | |
| 2007/0275811 A1 | 11/2007 | Starik | |

FOREIGN PATENT DOCUMENTS
GB   1509880   5/1978

* cited by examiner

*Primary Examiner* — Edwin A Young
(74) *Attorney, Agent, or Firm* — Wilmer Cutler Pickering Hale & Dorr LLP.

(57) ABSTRACT

A sequential planetary stack transmission system is provided. The system includes a stack of planetary gear sets, each gear set including a sun gear engageable with a rotatable central shaft, and freely rotatable concentrically about the central input or output shaft when not engaged with the central shaft. A plurality of planet gears engage with the sun gear, and a ring gear engages with the planet gears. The ring gears form a ring gear barrel rotatable as a unit concentrically with respect to the central shaft. A shifting assembly within the hollow central shaft engages sequentially with the sun gears to provide a desired gear ratio. The planetary stack assembly and the shifting assembly are disposed within a case. The system is suitable for a variety of applications, and is particularly suitable for bicycles.

26 Claims, 25 Drawing Sheets

SEQUENTIAL PLANETARY STACK TRANSMISSION SYSTEM

CROSS REFERENCE TO RELATED APPLICATIONS

This application claims the benefit under 35 U.S.C. §119 (e) of U.S. Provisional Patent Application No. 61/005,136, filed Dec. 3, 2007, the disclosure of which is incorporated by reference herein.

STATEMENT REGARDING FEDERALLY SPONSORED RESEARCH OR DEVELOPMENT

N/A

BACKGROUND OF THE INVENTION

Transmission systems find a variety of applications. One application is in bicycles, particularly to improve upon derailleur-based bicycle drive trains. A derailleur-based drive train typically includes a bottom bracket, crankset, one to three front chain rings, chain, front derailleur and/or chain guide, cassette, and rear derailleur. As the rider drives the crankset, the front chain ring drives the chain. The chain runs to the cassette and turns the rear wheel of the bike. The chain then runs through the rear derailleur as it returns back to the front chain ring. The rear derailleur moves across the cassette to move the chain from gear to gear, changing the ratio between input and output as the rider shifts gears. Similarly, a front derailleur moves across the chain rings to move the chain to each of the chain rings. These components are typically exposed on the bicycle, subjecting them to damage and contamination, and require a high degree of maintenance. This is particularly a problem with mountain bicycles, which have been developed for riding over rugged terrain.

Other applications for transmission systems include turbines, for example, windmill turbines, exercise equipment, internally geared hubs, automotive and motorcycle transmissions, industrial equipment and tools.

SUMMARY OF THE INVENTION

A transmission system is provided incorporating a series of gear sets, each including a sun gear and associated planetary gears. The sun gears share a common input or output shaft and are free to rotate unless engaged. In one embodiment, each sun gear and its associated planetary gears are a different size, such that the summation of the diameters of the sun gear and planetary gears is equal for each gear set. Thus, the series of gears can share a common ring gear barrel, which acts as a single output or input gear.

In one embodiment, a shifting assembly facilitates the engagement of individual sun gears and interfaces with standard cycling shifters. The shifting assembly includes a shifting bulb and a series of spring loaded pawls. Shifting is actuated by a pull cable attached to the shifter that slides the shifting bulb down the interior of the shaft. Through the use of spring loaded ball bearings, the shifting bulb pushes out individual sets of spring loaded pawls that pivot and engage the sun gears on an internal engagement surface. When the bulb is pulled away, a retaining spring forces the pawls to pivot back to their resting position, thus disengaging the sun gear.

DESCRIPTION OF THE DRAWINGS

The invention will be more fully understood from the following detailed description taken in conjunction with the accompanying drawings in which.

DETAILED DESCRIPTION OF THE INVENTION

Figure 1:
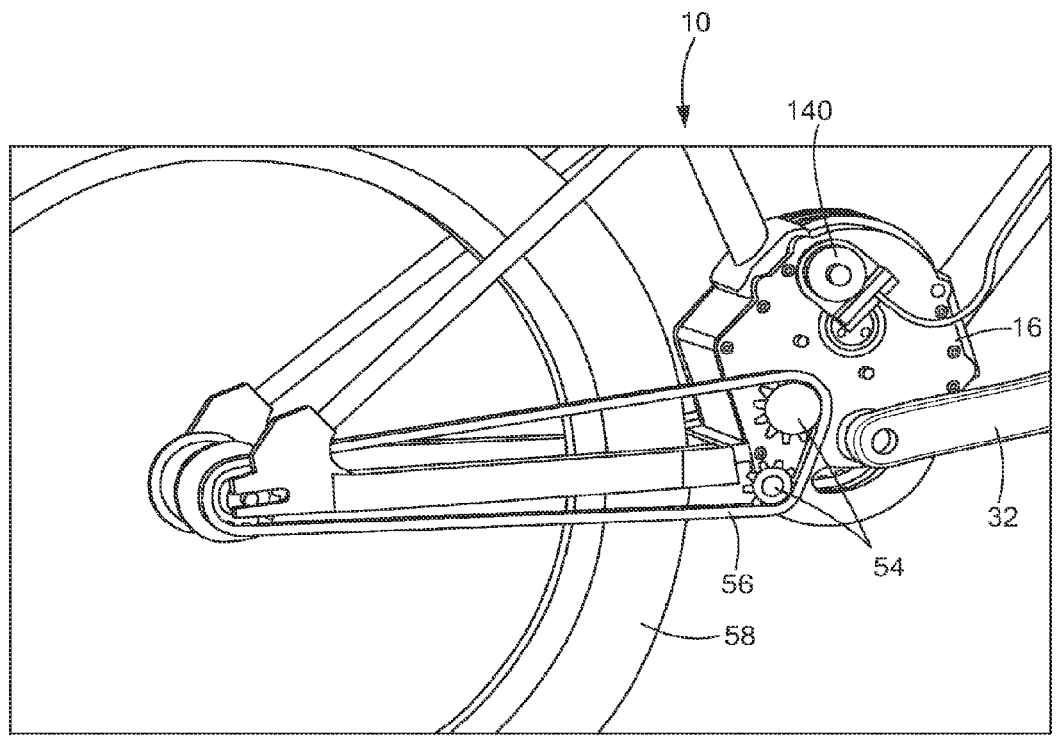
FIG. 1 is a partial isometric illustration of a transmission system according to the present invention in conjunction with a bicycle.
Figure 2:
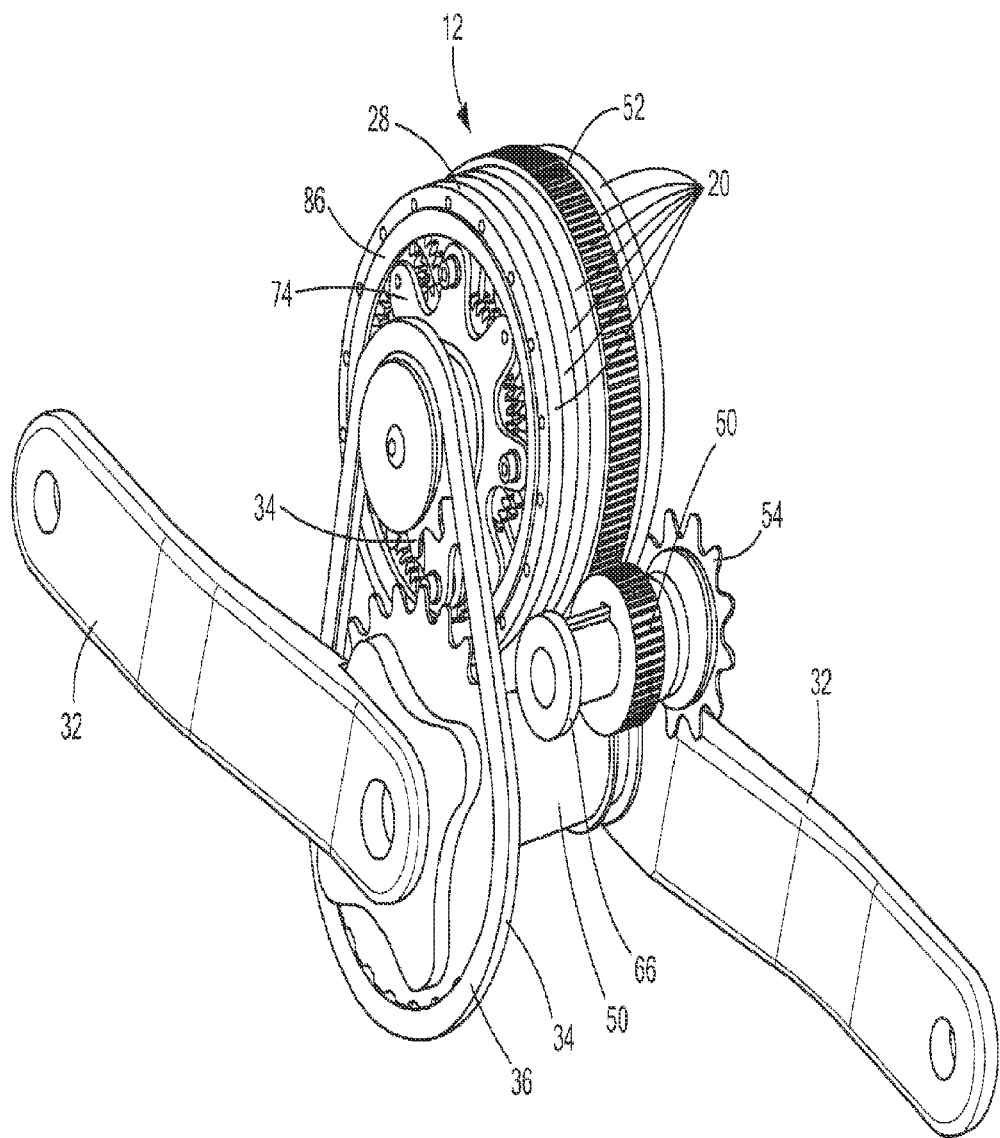
FIG. 2 is a further isometric illustration of the transmission system of FIG. 1.
Figure 3:
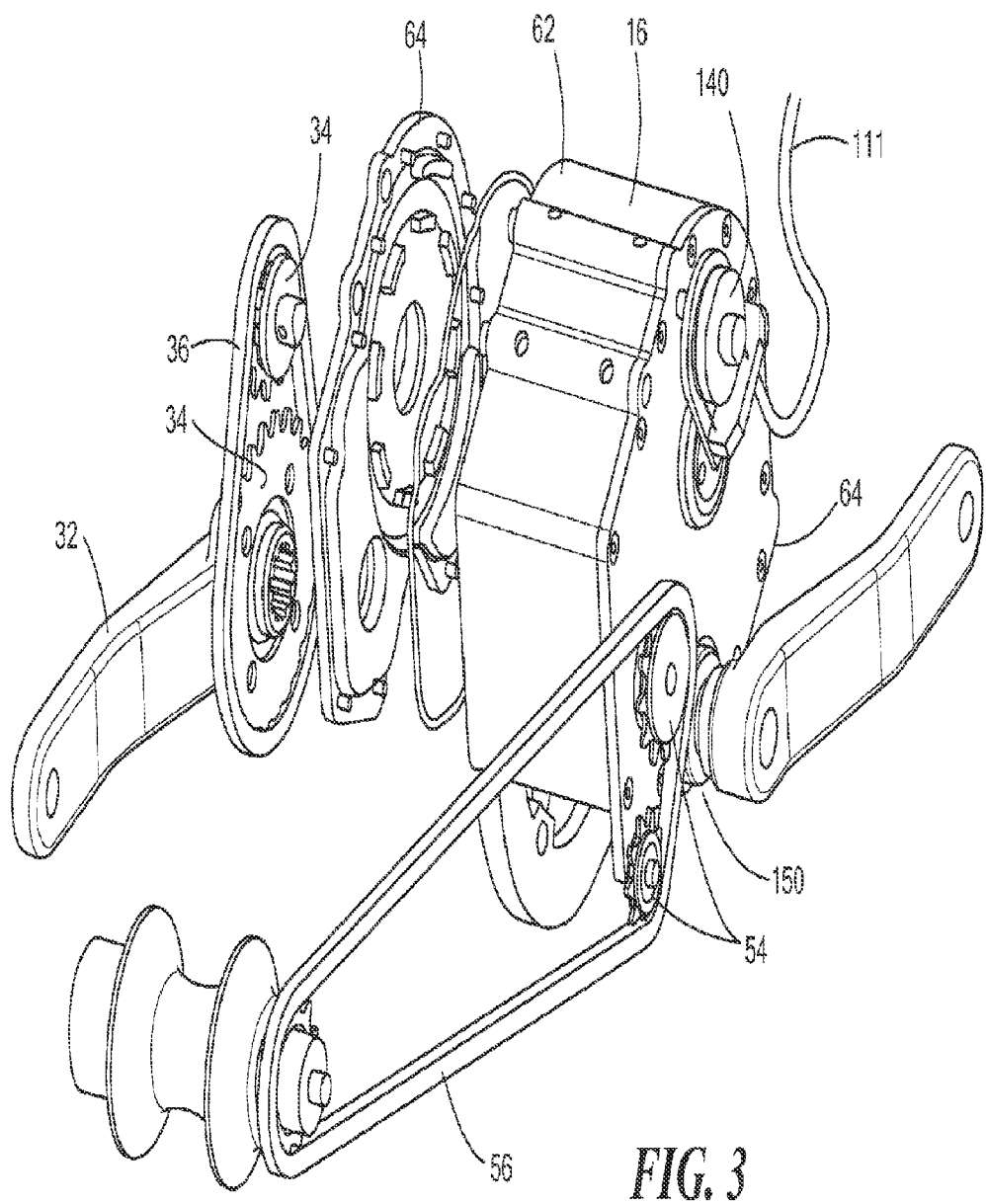
FIG. 3 is an exploded isometric view of the transmission system of FIG. 1.
Figure 4:
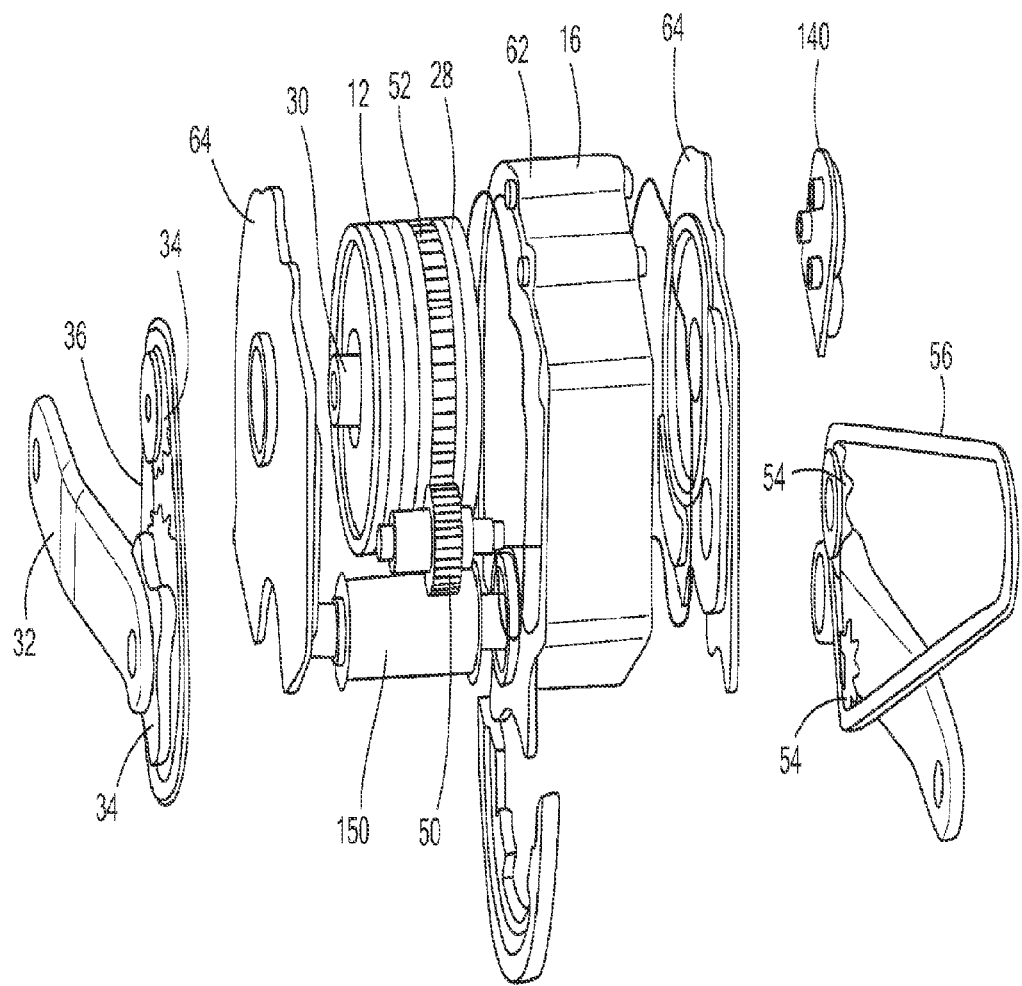
FIG. 4 is a further exploded isometric view of the transmission system of FIG. 1.

This application claims the benefit under 35 U.S.C. §119 (e) of U.S. Provisional Patent Application No. 61/005,136, filed Dec. 3, 2007, the disclosure of which is incorporated by reference herein.

Referring to FIGS. 1-10, a transmission system 10 according to the invention includes a planetary stack assembly 12 and a shifting assembly 14 housed in a case 16. The transmission system will be described with particularity in association with a bicycle (FIG. 1), although it will be appreciated that the transmission system can be used for other applications, such as a windmill, which may affect some aspects of the configuration of the transmission system, as would be apparent to one of ordinary skill in the art.

In the embodiment shown, the planetary stack assembly 12 incorporates a series of gear sets 20 arranged in a stack (FIGS. 5-8), each gear set including a sun gear 22 and associated planetary gears 24 within a ring gear 26. The ring gears are fixed to rotate in unison in a ring gear barrel 28. The sun gears share a common central, axially located, rotatable shaft 30, which may be an input shaft or an output shaft, depending on the application. For example, in a bicycle, the central shaft is an input shaft driven by pedals attached via crank arms 32 and, if needed, sprockets 34 and a chain 36 (FIGS. 1-4).

The sun gears 22 each include internal teeth 38 that engage with the shifting assembly 14 within the central shaft 30 (described further below) to select a desired sun gear to couple the sun gear to the central shaft. The sun gear also includes external teeth 40 that mesh with external teeth 42 of its associated planet gears 24. The planet gears in turn mesh with internal teeth 44 of the associated ring gear 26 or of ring gear barrel 28, concentrically arranged about the rotation axis of the central shaft 30. In this manner, rotational motion can be transmitted from the central shaft to the ring gear barrel or vice versa.

The sun gears 22 are all free to rotate about the central shaft 30 unless engaged. Each gear set 20 provides a particular gear ratio. The sun gear and associated planet gears of each gear set are a different size, such that the summation of the diameters of the sun gear and planet gears is equal for each gear set. Thus, the gear sets are able to share a common ring gear barrel 28, also concentric to the central shaft. The ring gear barrel 28 serves as a single output or input gear, depending on the application. The ring gear barrel 28 rotates in the opposite direction to the rotation of the central shaft 30. For a bicycle, a further non-concentric, reversal gear 50 is employed to mesh with external teeth 52 on the ring gear barrel 28 to provide output rotation in the same direction as the input shaft. The reversal gear is connected, for example, via sprockets 54 and a chain 56, to a rear bicycle wheel 58.

The ring gear barrel 28 and the stack of gear sets 20 are housed within the case 16 and supported by suitable bearings therein. In the embodiment illustrated, the case includes a main body 62 and two end plates 64. Openings through the end plates accommodate the input and output shafts, with suitable bearings 66.

Figure 5:
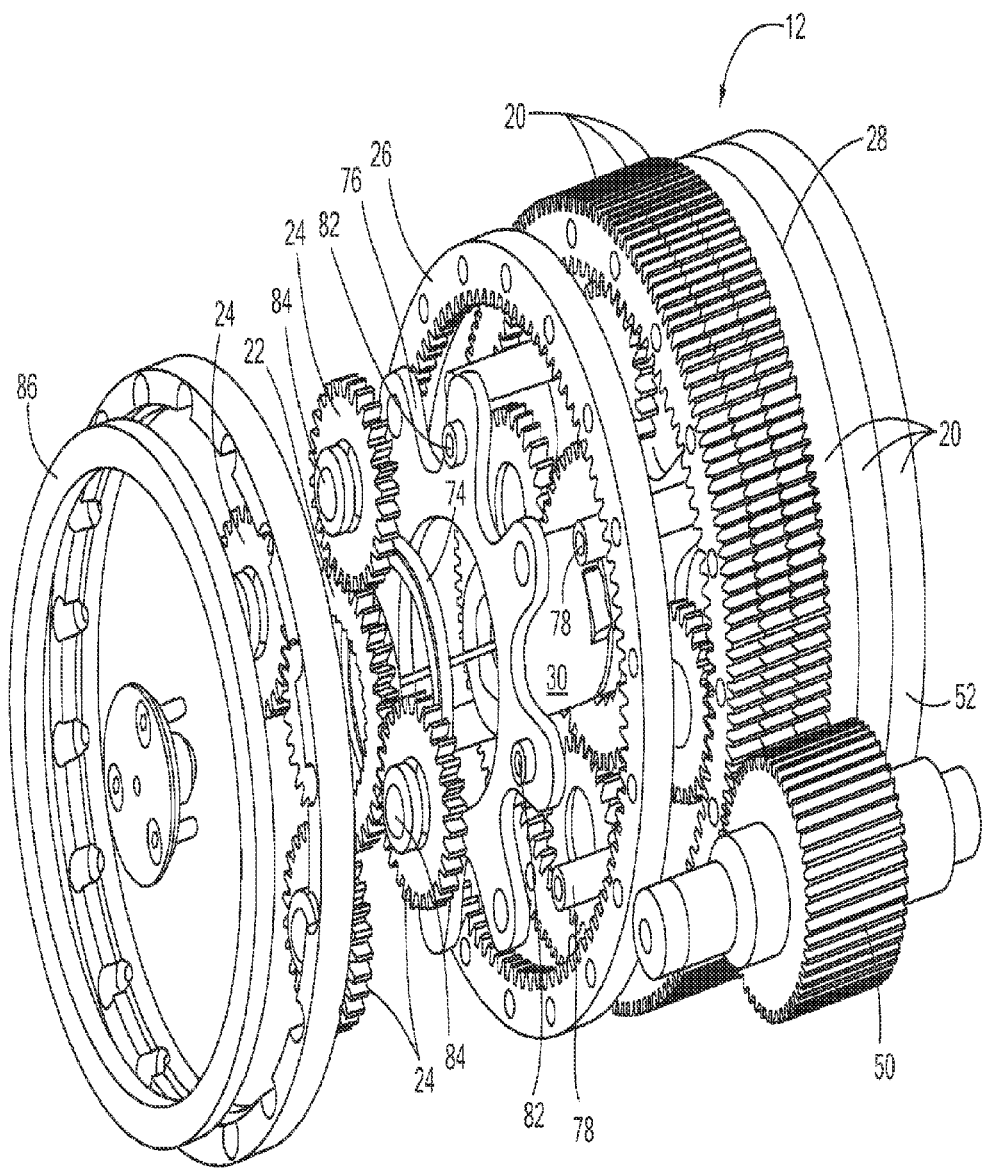
FIG. 5 is a partially exploded isometric view of the planetary stack of the transmission system of FIG. 1.
Figure 6:
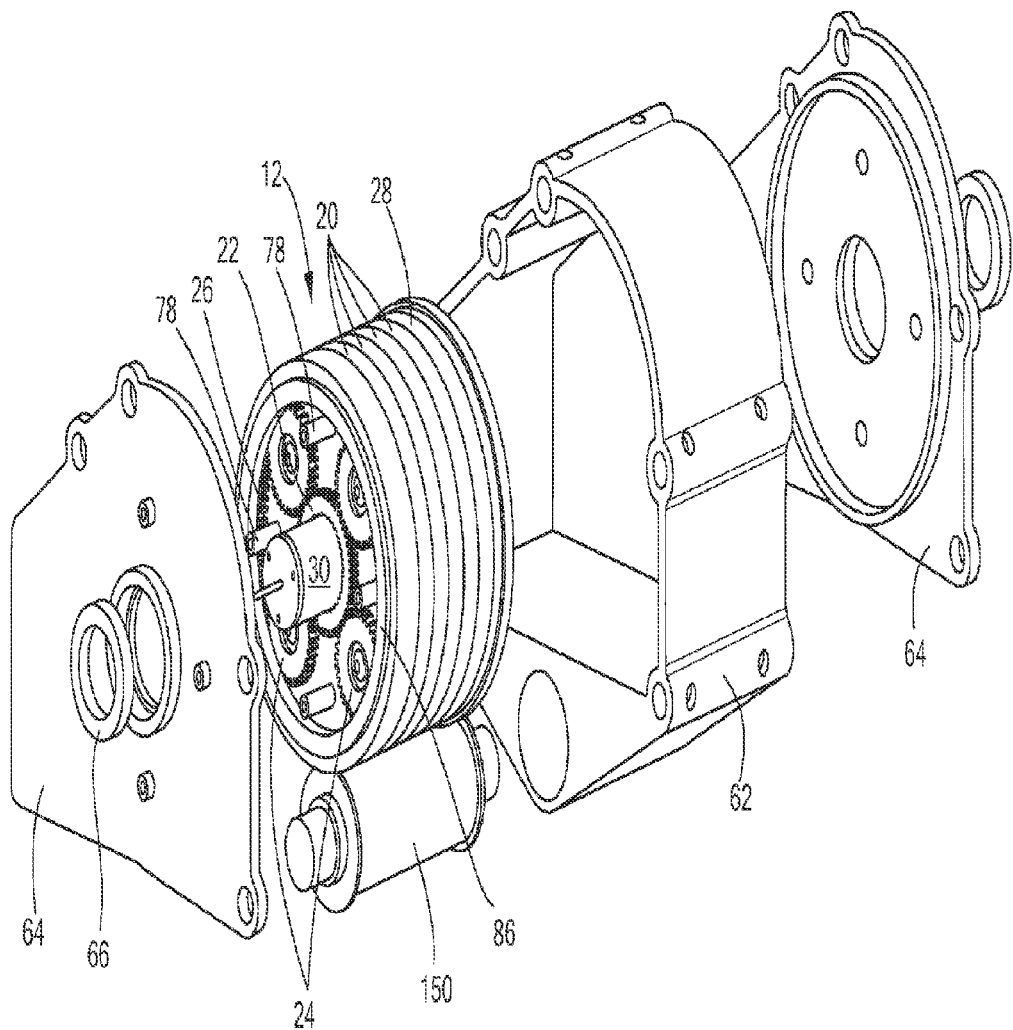
FIG. 6 is an exploded isometric view of the planetary stack in a case of the transmission system of FIG. 1.
Figure 7:
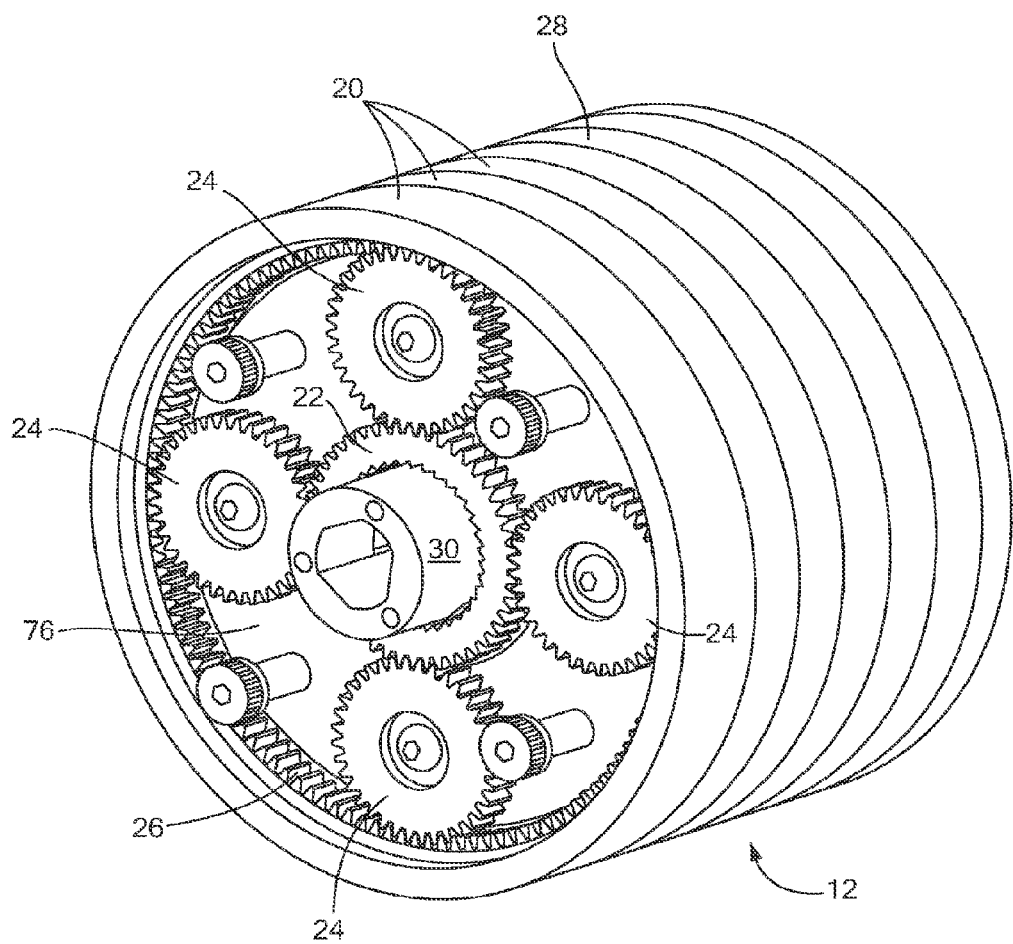
FIG. 7 is an isometric view of the planetary stack of the transmission system of FIG. 1.
Figure 8:
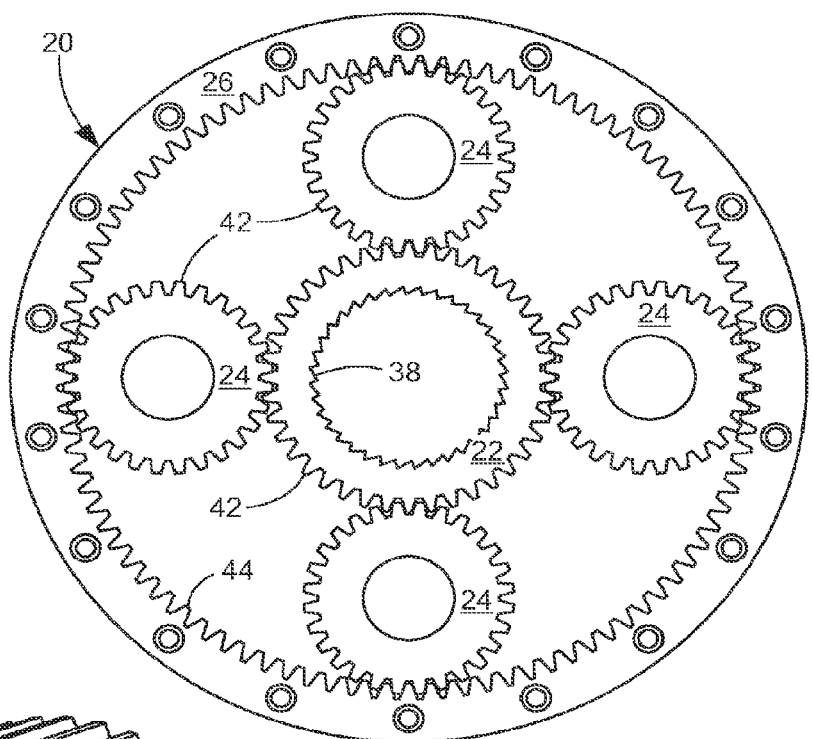
FIG. 8 is a plan view of a gear set of the transmission system of FIG. 1.
Figure 9:
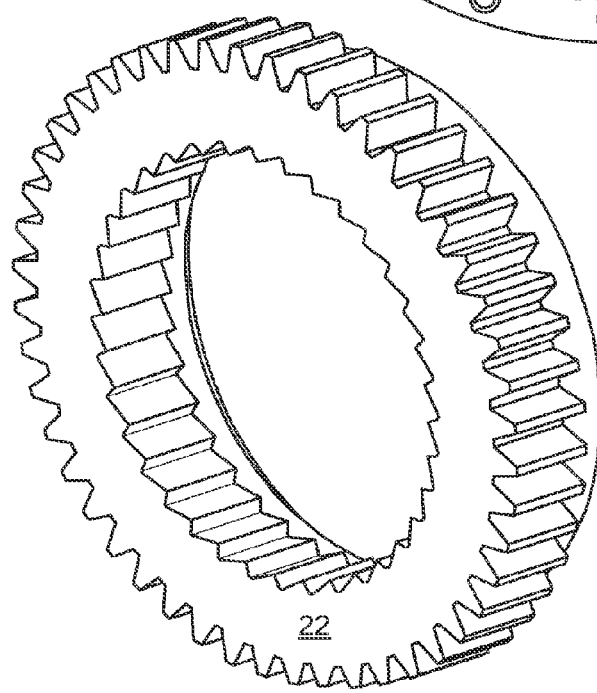
FIG. 9 is an isometric view of a sun gear of the gear set of FIG. 8.

Each sun gear 22 includes a bearing surface 72 extending axially to one side (FIG. 9) that is supported for rotation by a sun bearing 74 within an opening in an associated support plate 76. The support plates are fixed to the end plates 64 of the case 16 by, for example, rods 78 that extend the length of the case (FIG. 5). Each support plate further includes posts 82 on which the planet gears 24 are supported for rotation via suitable bearings 84 (FIG. 5).

The ring gear barrel 28 is mounted for rotation within the case 16 by suitable bearings 86 at the ends of the case (FIG. 5). As noted above, the ring gear barrel includes a set of internal teeth 44 associated with each gear set 20. The ring gear barrel can be formed as an integral piece or can be formed of a plurality of separate ring gears fastened together, such as with bolts. For the bicycle application, the ring gear barrel also includes the set of external teeth 52 to mesh with the non-concentric reversal gear 50. In other applications, the ring gear barrel may couple directly to another component for input or output. In an alternative embodiment, the ring gears 26 can be of different diameters if the planet gears are the same size throughout the stack.

The gear set 20 must be designed so that the gears mesh. As known in the art, for a planetary system having a number of planets meshing into both a sun gear and a ring gear, the feasibility of gear mesh can be calculated by determining a Feasibility Value. The Feasibility Value is determined by dividing the sum of the number of teeth in the ring gear and the number of teeth in the sun gear by the number of planets. If the feasibility value is an integer, the system can mesh.

The range of gear ratios can be selected for the application. For example, for a downhill mountain bicycle, the gear ratio range is generally 1.125 to 3.4. Also, the range can be further scaled at both the input and the output. For example, considering a bicycle, by using chain and sprocket interfaces between the crank arms and the gearbox input and between the gearbox output and the rear wheel, different scaling factors may be obtained by changing sprocket ratios.

As noted above, the central shaft 30 is hollow to accommodate the shifting assembly 14. In the embodiment illustrated in FIGS. 10-13, the shifting assembly includes a shifting bulb 92 that translates through the interior of the hollow shaft 30. The shifting assembly also includes a pawl or set of pawls 94 associated with each gear set 20. As the shifting bulb translates through the shaft, it sequentially encounters each set of pawls. In the embodiment shown, three pawls are equally distributed circumferentially around the shaft for each gear set. When selected by the shifting bulb, the selected pawl or set of pawls couples the associated sun gear 22 to the central shaft 30, thereby providing the desired gear ratio.

Figure 14:
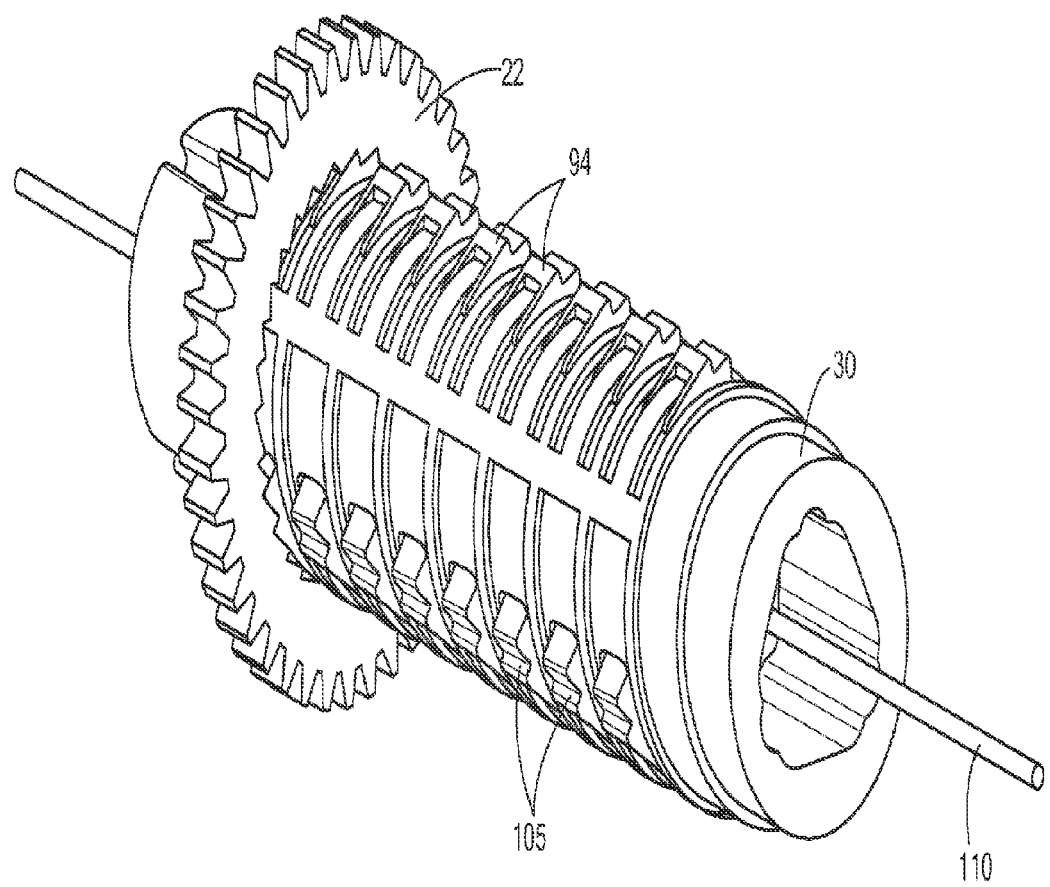
FIG. 14 is an isometric view of a further embodiment of a biasing member for use with the shifting assembly and further illustrating engagement of a set of pawls with a sun gear.
Figure 15:
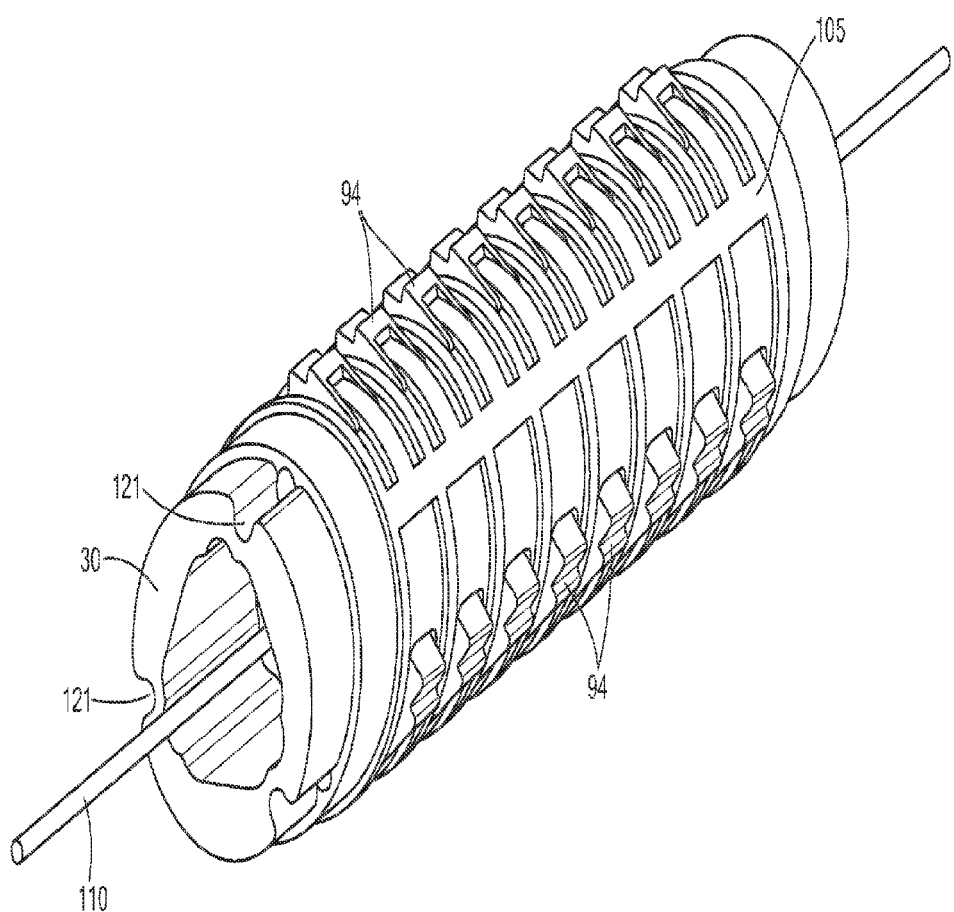
FIG. 15 is an isometric view of a further embodiment of the central shaft of the transmission system.

More particularly, the pawls 94 are pivotably mounted within pockets or recesses 96 formed through the shaft 30. For example, a pivot rod can extend through a passage 98 along the length of the shaft and through openings 102 within the pawls, with the pawls disposed on the rod. Each pawl extends through its associated pocket 96 to the interior of the shaft for engagement by the shifting bulb 92. The pawls are biased by a biasing member 104 into a recessed position within the shaft 30 decoupled from the associated gear set. In the embodiment illustrated, the biasing member is a return spring such as an elastic member or a metal open ended ring, provided in a circumferential groove in the shaft. The return spring fits through a channel on an ear on the pawl. In another embodiment, the biasing members are formed as a single component 105 with multiple leaf springs that piggyback the pawls 94, illustrated in FIGS. 14-15.

Each pawl 94 includes engagement faces 106, 108 for engagement with the internal teeth 38 of an associated sun gear 22. When a pawl is selected by the shifting bulb 92, it protrudes out of the pocket 96 in the shaft 30 into the path of the sun gear, thereby engaging the sun gear and coupling the sun gear to rotate with the central shaft.

Figure 10:
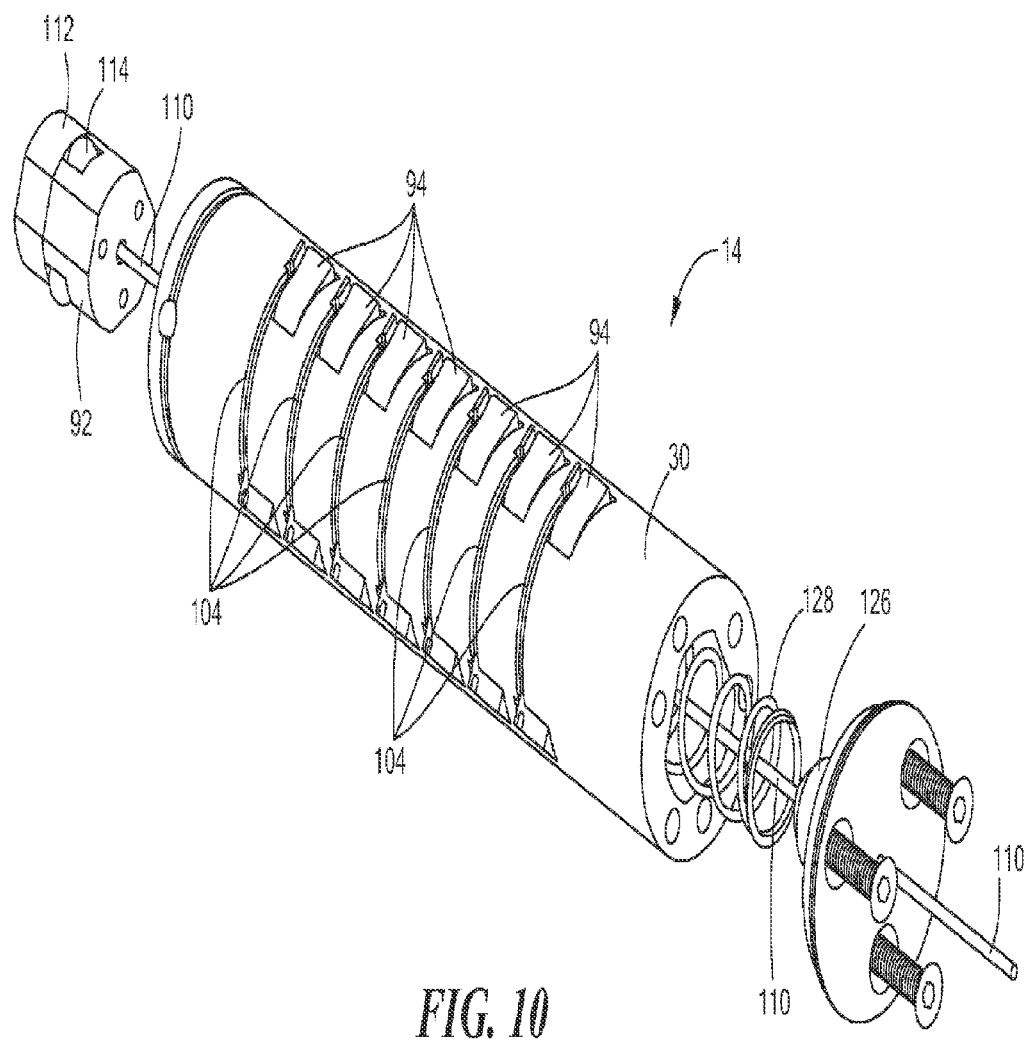
FIG. 10 is an exploded view of a shifting assembly of the transmission system of FIG. 1.
Figure 11:
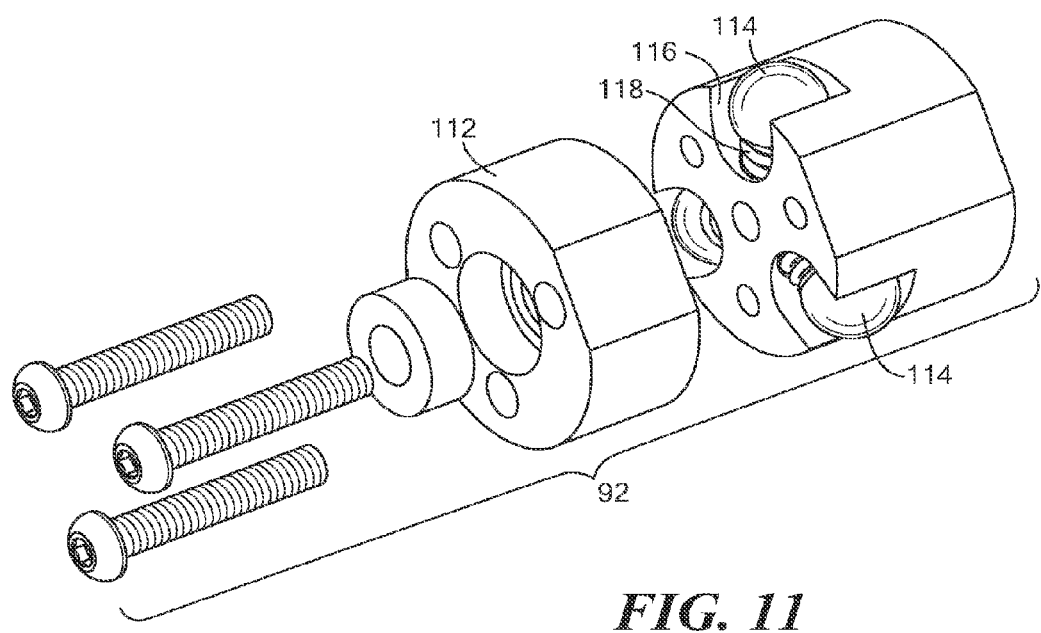
FIG. 11 is an exploded view of a shifting bulb of the shifting assembly of FIG. 10.
Figure 12:
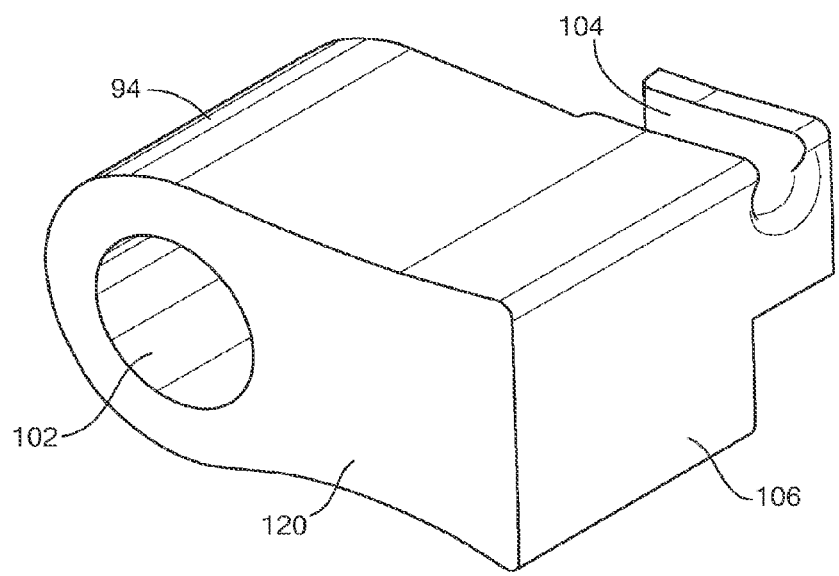
FIG. 12 is an isometric view of a pawl of the shifting assembly of FIG. 10.
Figure 13:
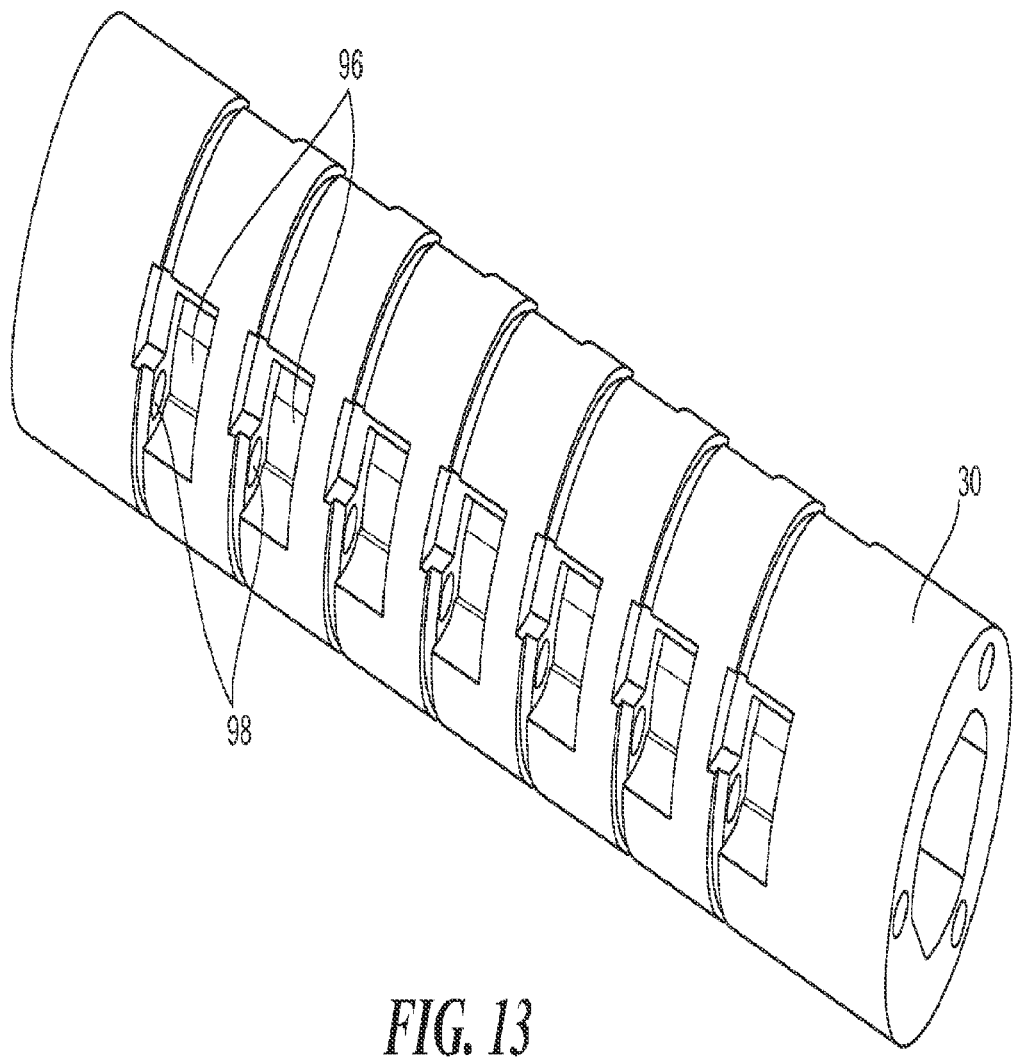
FIG. 13 is an isometric view of a central shaft of the transmission system of FIGS. 1 and 10.

In the embodiment illustrated in FIGS. 10-11, the shifting bulb 92 is pulled through the shaft via pull cable 110, for example, attached to a shifter mounted on a bicycle handlebar, as would be known in the art. The shifting bulb includes a bulb body 112 that fits within the shaft. Several ball bearings 114 are located in recesses 116 within the bulb body. The balls 114 are biased outwardly, such as with a compression spring 118 in the bottom of the recesses 116. The spring-loaded balls are depressed within the recesses as the bulb slides through the shaft. As the bulb reaches one of the pawl sets, the balls extend outwardly and interfere with a surface 120 on the pawl 94. The springs 118 continue to push the pawls outwardly to engage the sun gear. The bulb can be made from any suitable material, such as aluminum, which can be readily machined.

In the embodiment shown, the bulb body is provided in two separate pieces for ease of maintenance; springs and balls may exhibit wear over time, so the capability of removing the springs and balls is useful.

In another embodiment, the shaft 30 may include channels 121 through which the ball bearings move when the bulb is pulled through the shaft. See FIG. 15. In this case, the pawls include a chamfered leading edge that allows effective interaction between the pawl and the ball bearing.

The shifting assembly is able to freewheel. For a bicycle, by utilizing a fixed gear rear wheel hub, the chain to the rear wheel is constantly moving when the wheel is moving. When the rider is not pedaling, the pawls continually ratchet ensuring disengagement from the sun gears. As soon as the rider pedals, the pawls match the speed of the sun gear and drive the system. This freewheeling assembly allows the system to be shifted to any desired gear not only under light pedaling but also when the rider is not pedaling.

Because the bulb 92 is located in a constantly spinning shaft 30, the cable 110 is attached to a bearing 126 so that it does not twist. A return spring 128 is attached to the bulb and end of the shaft to maintain a resistive force on the bulb. See FIG. 10. This spring acts as a return force for a downshift. The shifting bulb return spring may be located within the central shaft 30 directly acting on the bulb or it may be located remotely using a secondary cable (not shown) to interact with the bulb. For bicycle applications, it is advantageous for shifting performance to use a constant force spring, such as a clock spring or power spring, to normalize the force required to shift between each gear.

Figure 16:
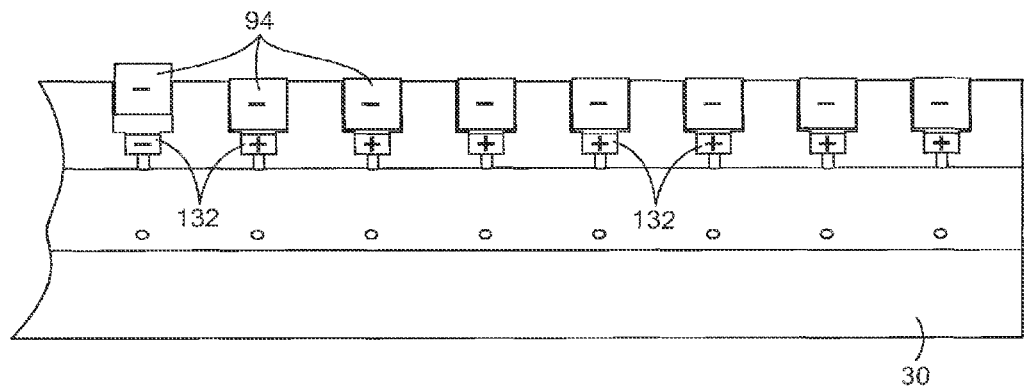
FIG. 16 is a cross-sectional view of a further embodiment of a shifting assembly.
Figure 17:
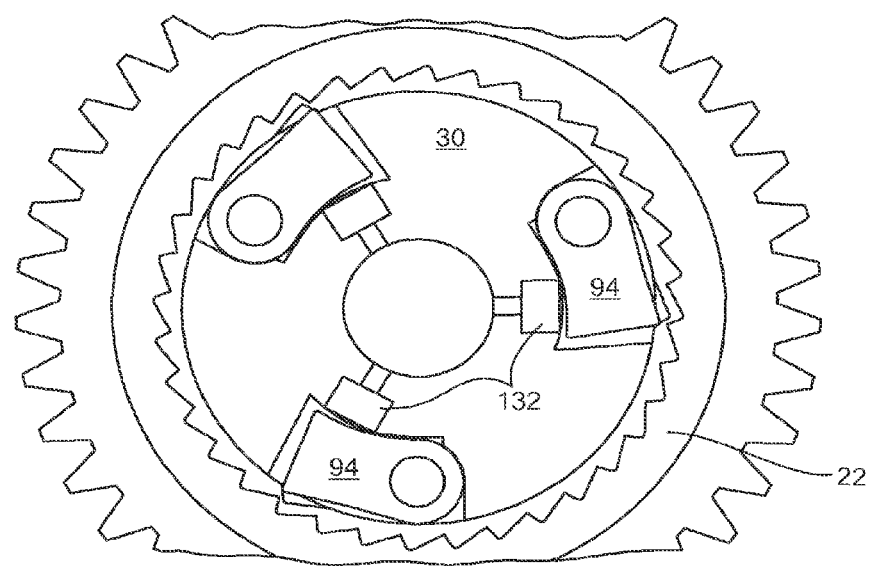
FIG. 17 is a side cross-sectional view of the shifting assembly of FIG. 16.

In another embodiment, the shifting assembly 14 includes electromagnets 132 that control the motion of the pawls 94. Referring to FIGS. 16-17, a series of electromagnets 132 are located within the central shaft in conjunction with an associated pawl. Actuation of a particular electromagnet actuates engagement of the adjacent pawl with its associated sun gear. Any suitable control system (not shown) can be provided to control actuation of the electromagnets.

Figure 18:
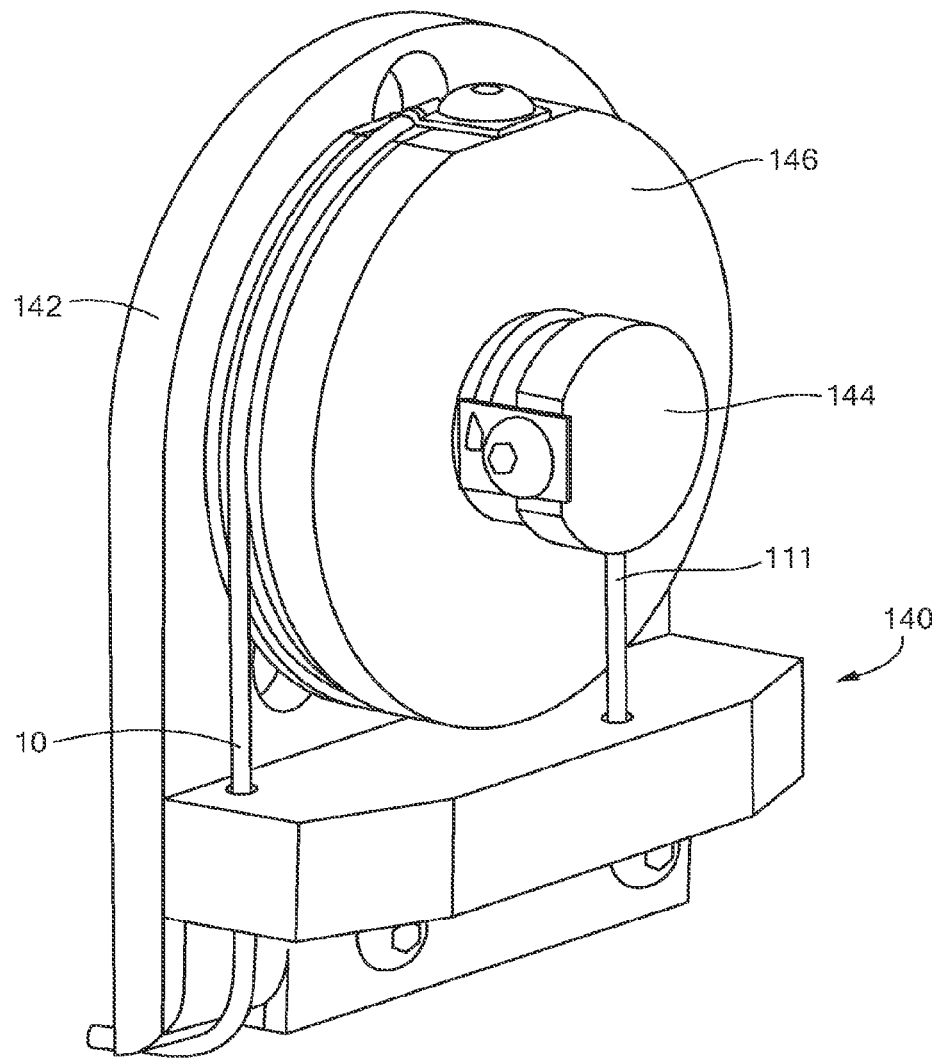
FIG. 18 is an isometric view of a shifting scalar assembly for use with the transmission system.

A shifting scalar mechanism 140 can be provided if desired for the application. See FIGS. 1, 3, 4, and 18. For example, one type of bicycle shifter pulls 3.45 mm of cable in a single throw, whereas the shifting bulb may need to move a greater distance, such as 10 mm. Referring to FIG. 18, one embodiment of a shifting scalar mechanism includes a pulley 142 with a smaller diameter wheel 144 and a larger diameter wheel 146. The cable 111 from the shifter rotates the smaller diameter wheel, which in turn rotates the larger wheel of the pulley. The cable 110 attached to the larger wheel pulls the shifting bulb through the shaft.

Figure 19:
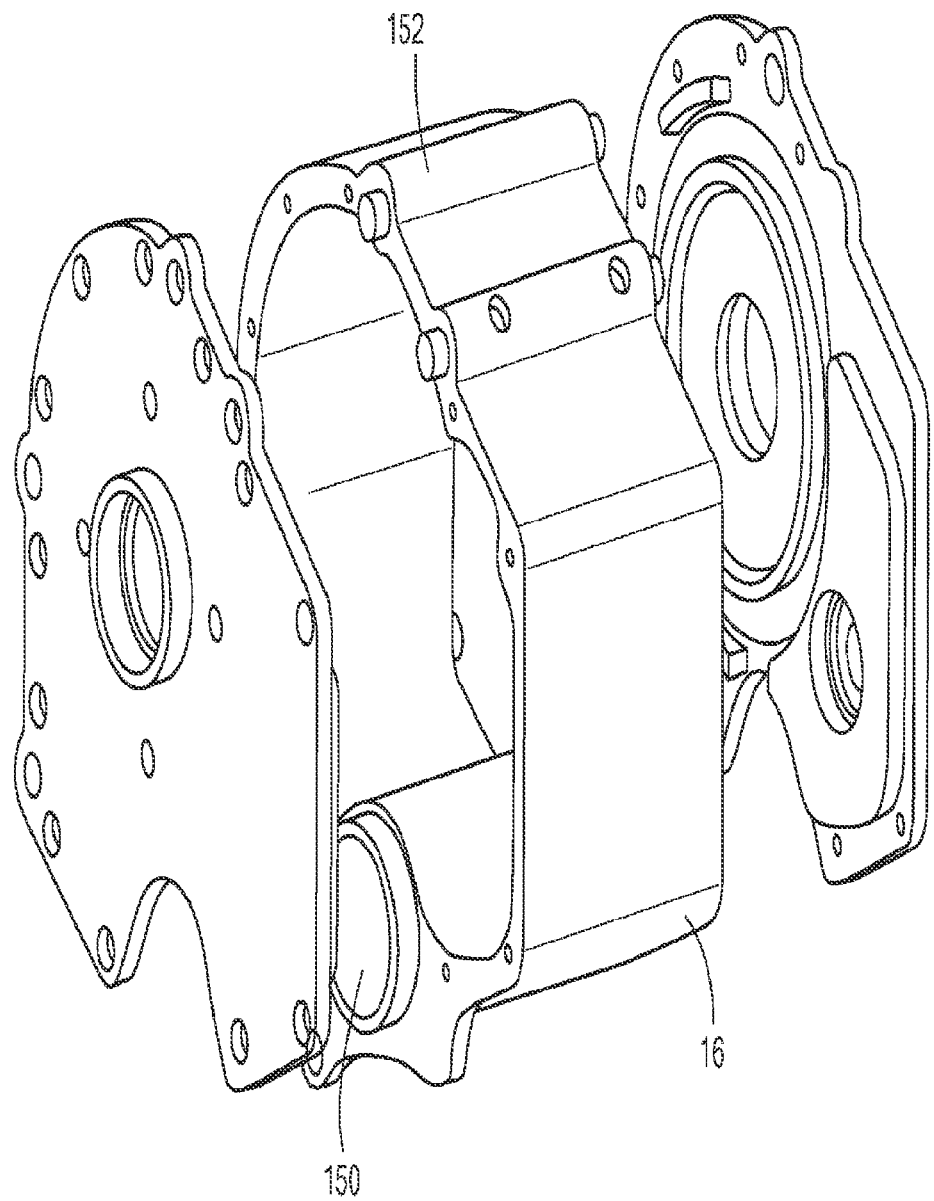
FIG. 19 is an exploded isometric view of the case of the transmission system.

As noted above, the components of the transmission system are housed in a case 16. See FIG. 19. The case can be designed to take into consideration expected loads such as from impacts. Preferably the case is sealed to protect the components from contamination from fluids and particulates and from impact damage. Also, the case includes mounting or fastening components, such as a bottom bracket 150, so that the case can be securely mounted to the surrounding structure, such as a bicycle frame. This allows impacts to be transmitted through the case to the surrounding structure, which can be more readily strengthened to absorb impacts. If desired, the case can be designed with features 152 to interface with mounting standards, such as the G-CON 2.0 standard for bicycles, and with standard bicycle components such as bottom brackets, cranksets, and shifters.

In a bicycle, the transmission system can be mounted at the junction of the seat tube, down tube, and chain stay (or swing arm in the case of a full suspension bicycle) of the bicycle frame. This is the lowest point on the bicycle to mount the system and thus provides a low center of gravity for the bicycle, leading to more stable and nimble riding performance. The bottom bracket 150 is supported by the case, and the transmission system can thus be isolated from any non-rotational-based load forces that would occur during intense riding conditions.

The components of the transmission system can be manufactured from any suitable materials. For example, the gears can be made from a suitable aluminum, stainless steel or other metal. The planetary support plates can be made from metals, carbon fiber composite materials, or plastics. The central shaft is preferably formed from a suitably strong material, such as a hard steel alloy. The case can be made from a metal such as aluminum or a composite material or a combination of a metal and composite material. Material selection can be optimized based on stress, weight, cost, lifetime, and wear characteristics for the intended application.

A suitable wet or dry lubricating material can be included to keep the components lubricated. For example, a bath of wet lubricant can be provided in a basin at the bottom of the case, through which the components pass during rotation, and particulates can collect in the basin. The lubricating material can reduce wear and noise, and improve heat dissipation and efficiency.

Figure 20:
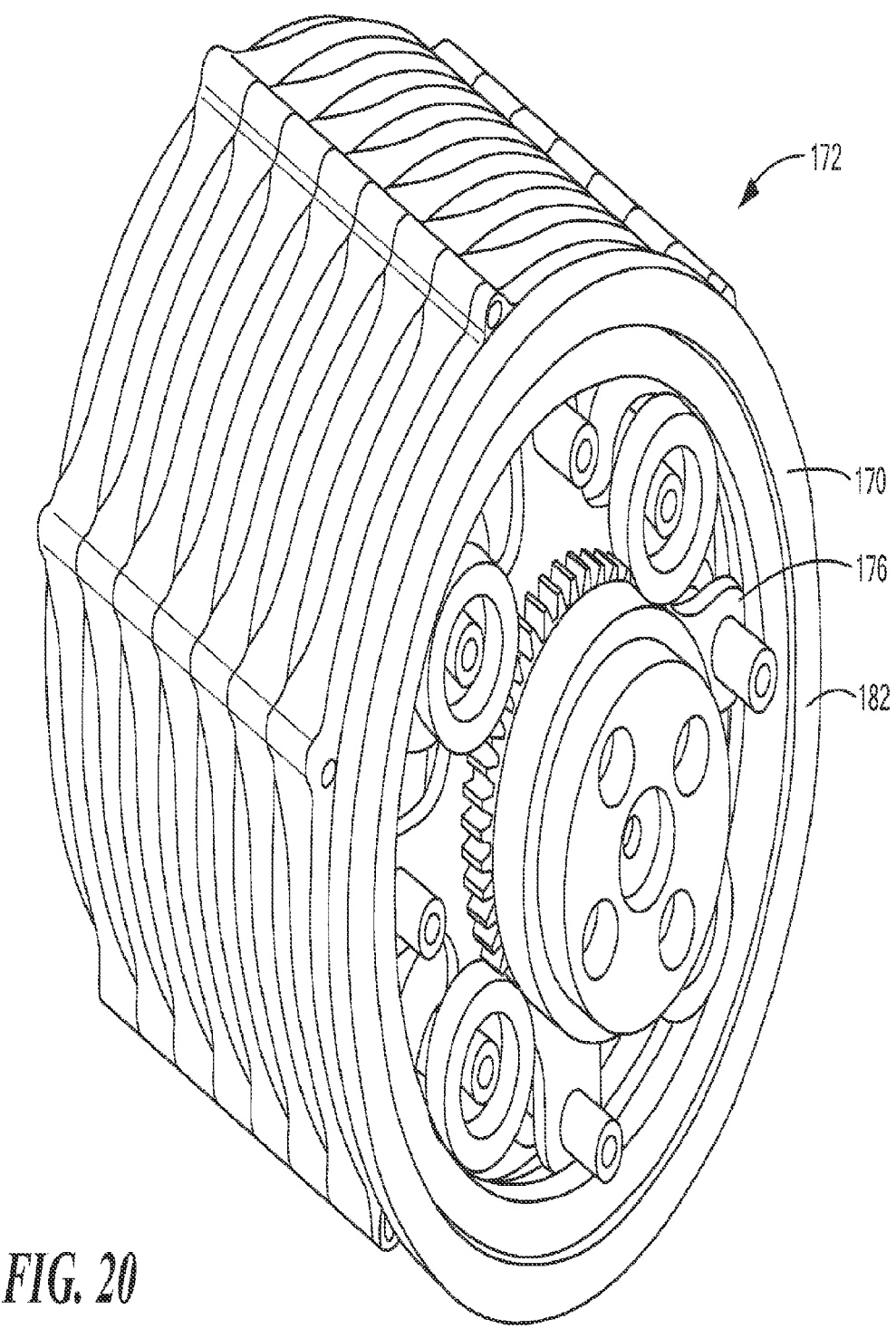
FIG. 20 is an isometric view of a further embodiment including a concentric planetary reversal configuration.
Figure 21:
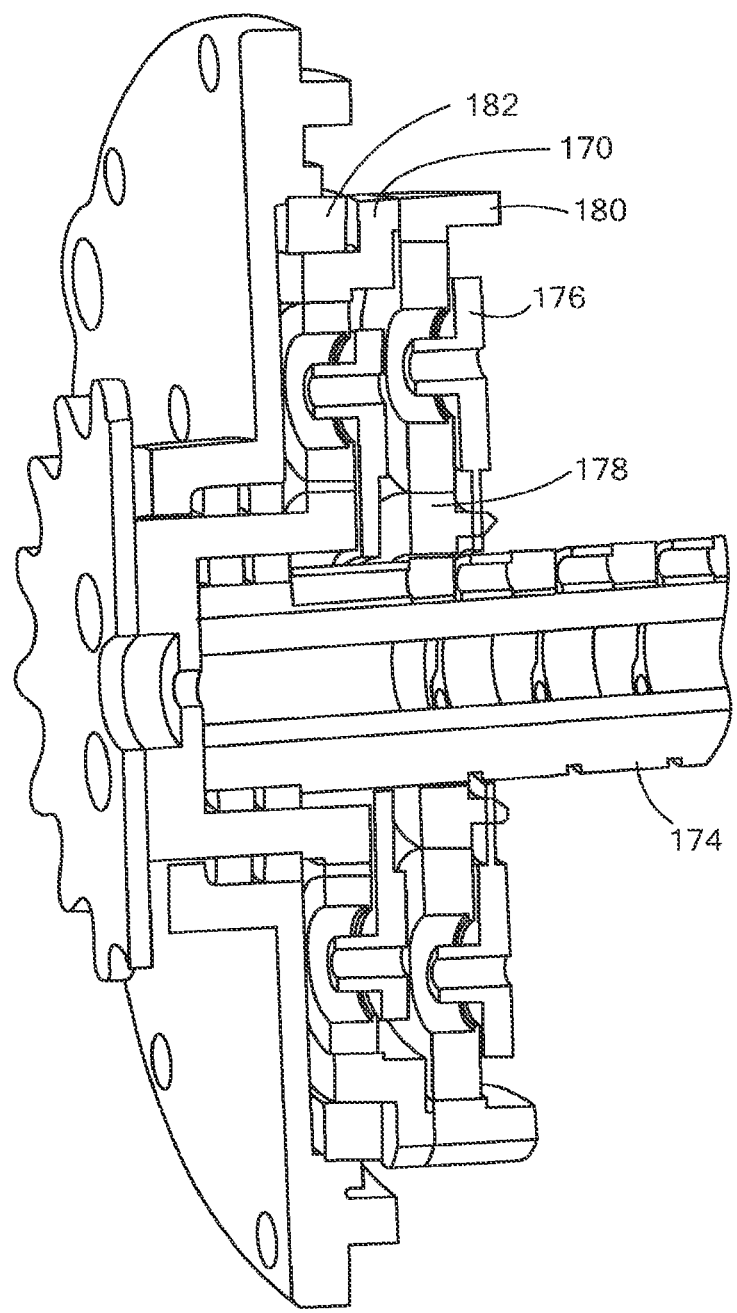
FIG. 21 is a partial isometric view of the embodiment of FIG. 20.
Figure 22:
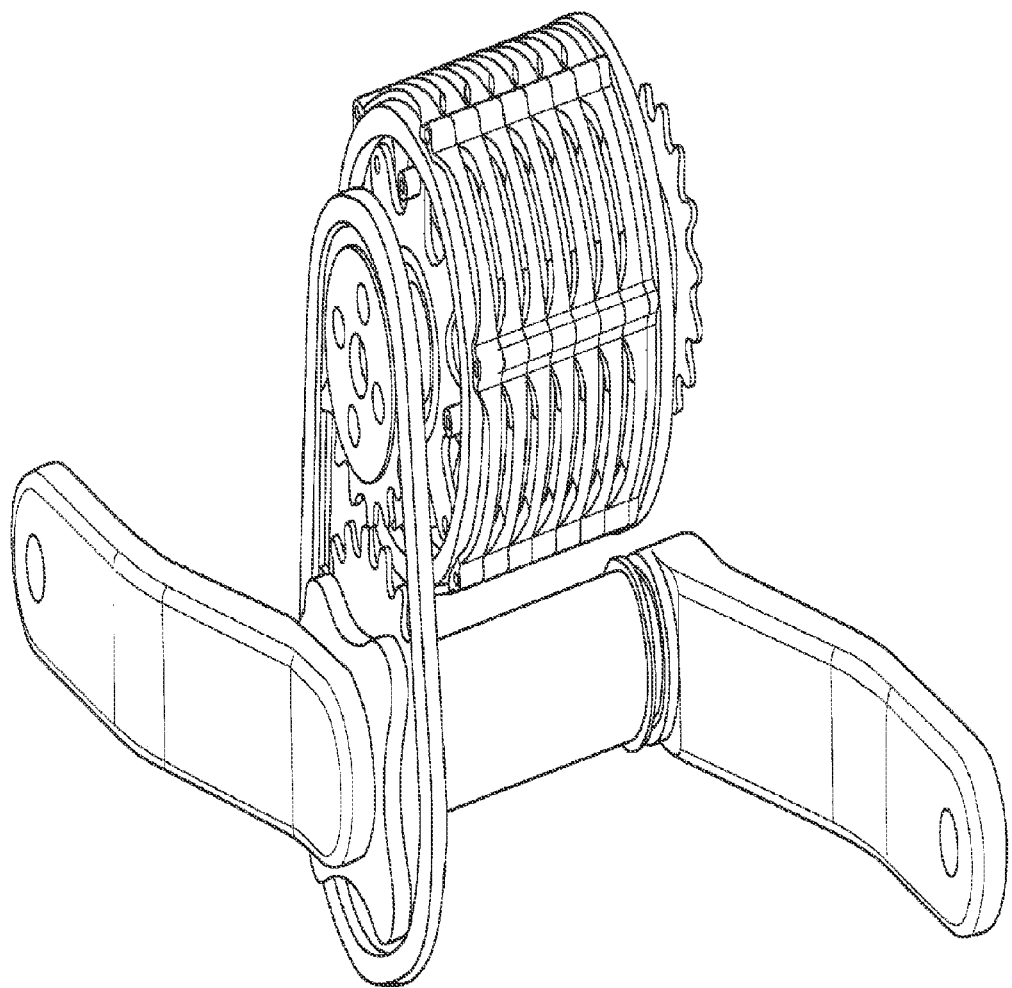
FIG. 22 is an isometric view of the embodiment of FIG. 20 in conjunction with a bicycle.
Figure 23:
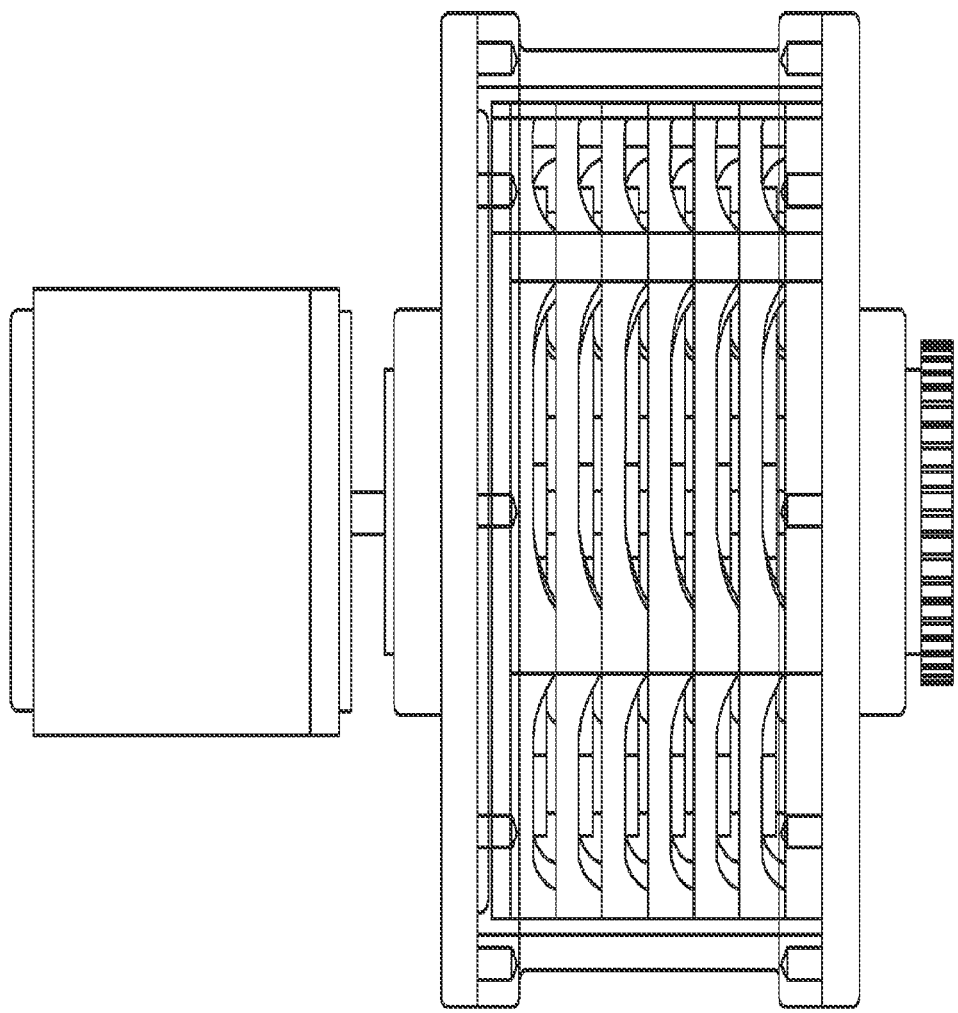
FIG. 23 is a front view of the embodiment of FIG. 20 illustrating a motor connected to the central shaft.

FIGS. 20 and 21 illustrate a further embodiment of a transmission system including a concentric planetary reversal configuration. An additional planetary gear set 170 is added at the end of the planetary stack 176. This additional gear set is free to rotate relative to the central shaft 174. The support plates 176 are fixed. When a sun gear 178 is selected, the ring gear barrel 180 spins concentrically about the central shaft and drives an output gear 182 through the planetary reversal. This configuration can be packaged efficiently and can provide a reduction in system stress. This embodiment is illustrated in conjunction with a bicycle in FIG. 22 and in conjunction with a motor attached to drive the central shaft in FIG. 23.

Figure 24:
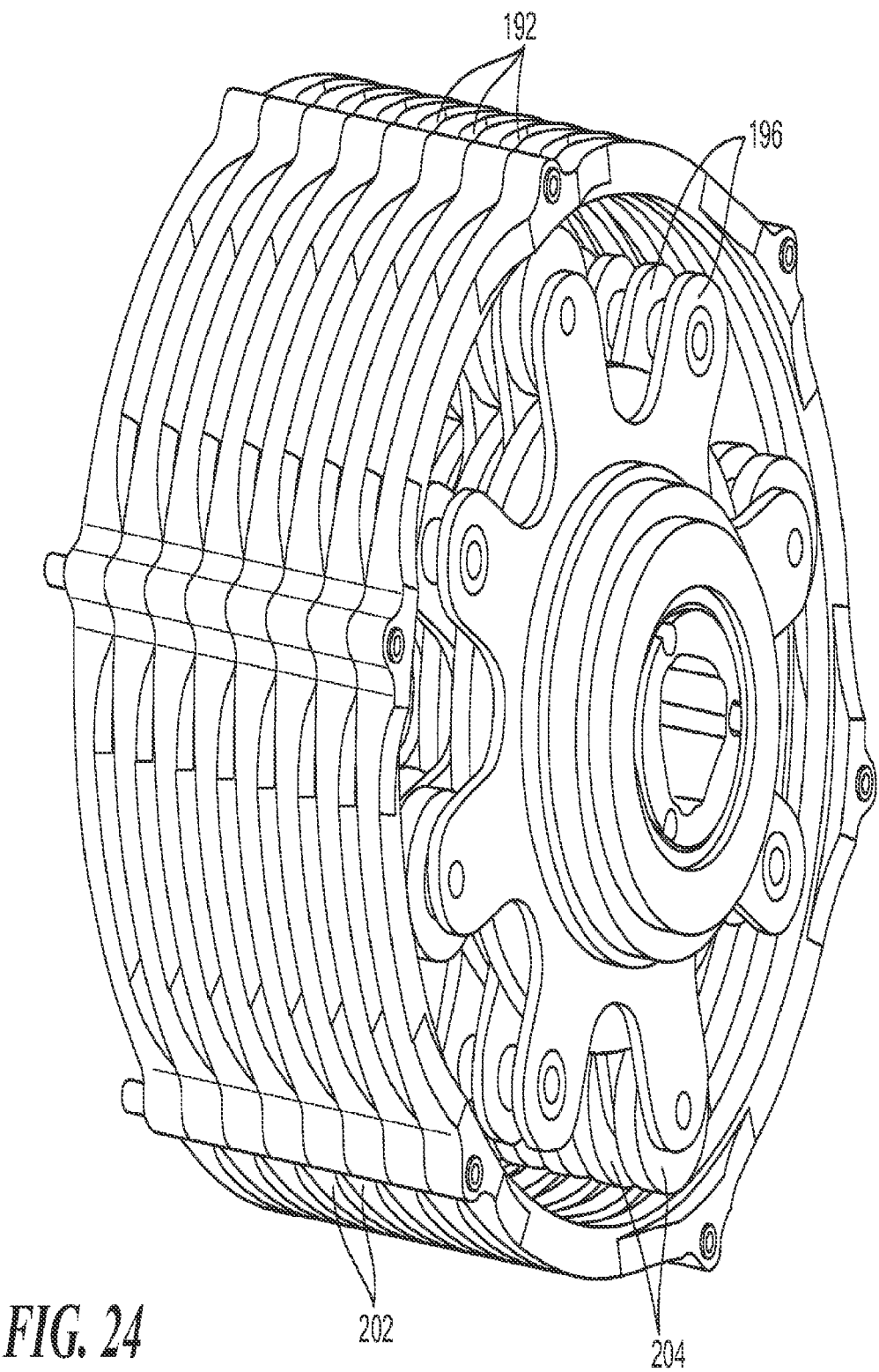
FIG. 24 is an isometric view of a concentric carrier drive embodiment.
Figure 25:
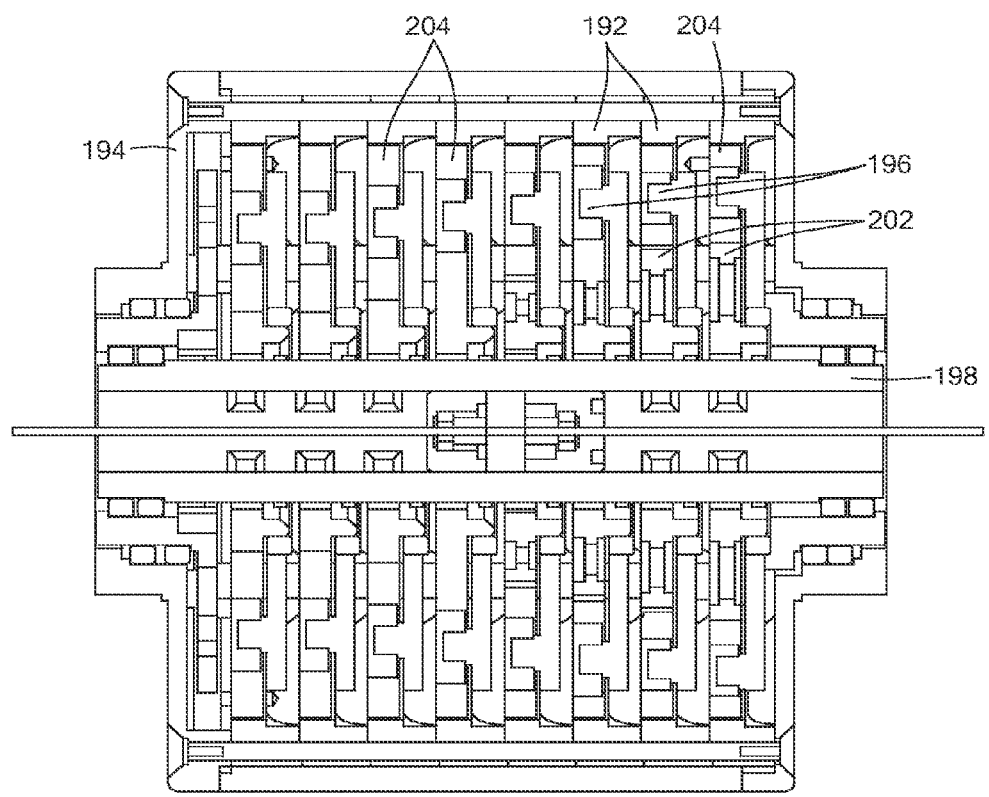
FIG. 25 is a cross sectional view of the embodiment of FIG. 24.

FIGS. 24-25 illustrate a still further embodiment of a transmission system having a concentric carrier drive configuration. The ring gears 192 are fixed to the case 194. The support or carrier plates 196 are fixed to each other and are able to rotate as a unit concentrically about the central shaft 198. When a selected sun gear 202 is engaged, its associated planet gears 204 cause the support plates to rotate at the selected ratio. This embodiment achieves the same overall ratios as the embodiment of FIGS. 1-10, but does not require reversal. This embodiment is further advantageous in that it can be compactly packaged.

Figure 26:
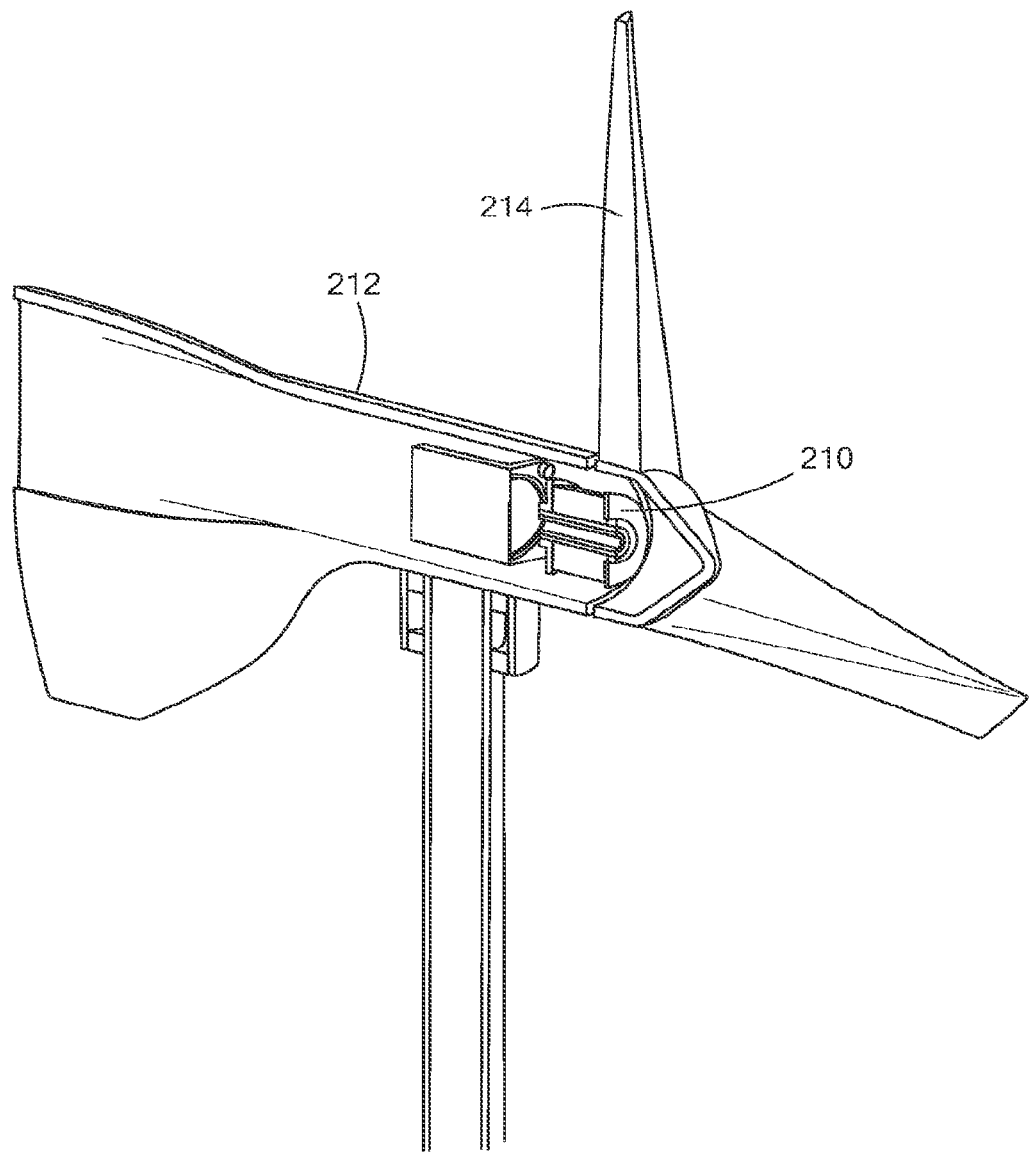
FIG. 26 illustrates a transmission system used in conjunction with a windmill.
Figure 27:
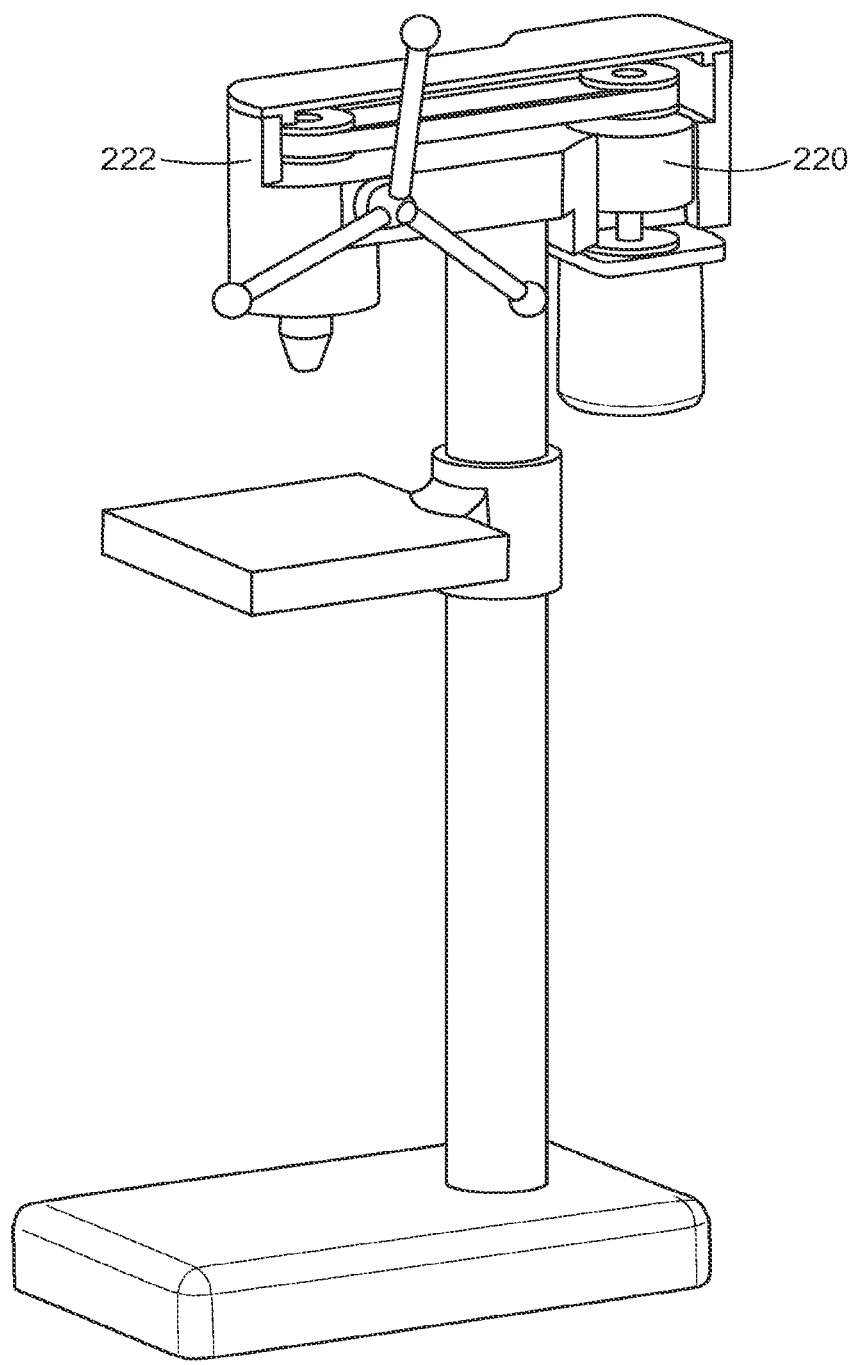
FIG. 27 illustrates a transmission system used in conjunction with a drill press.

The transmission system can be used in a variety of applications. For example, FIG. 26 illustrates an embodiment of a transmission system 210 in a windmill 212. The windmill vanes 214 are connected to the drive shaft, for example, the central shaft, of the transmission system. The system output is connected to a generator. The transmission system can optimize rotational velocity to increase overall power generation. FIG. 27 illustrates the use of a transmission system 220 in a drill press 222.

Figure 28:
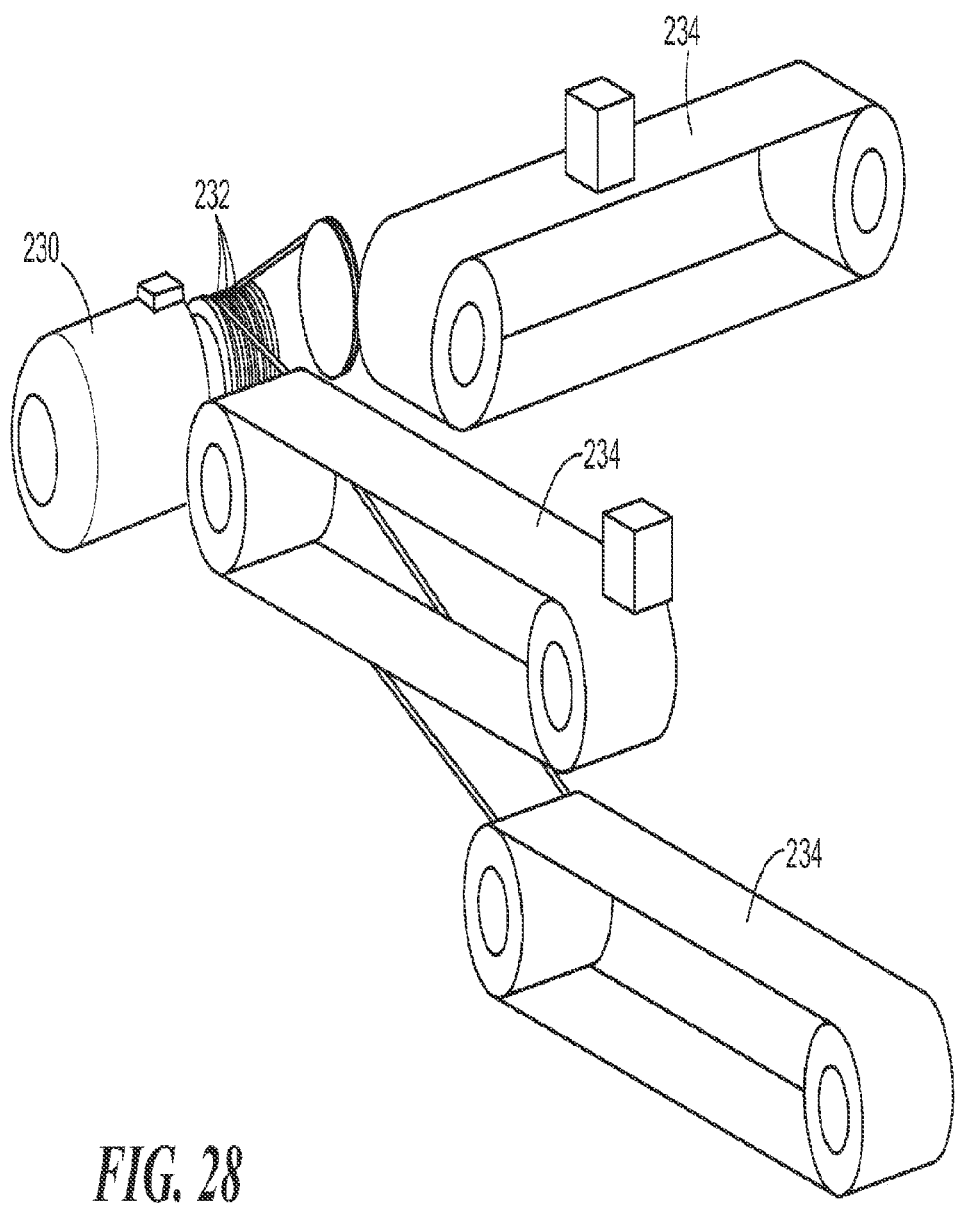
FIG. 28 illustrates a transmission system having multiple outputs.

FIG. 28 illustrates a further embodiment in which multiple outputs are provided from a transmission system 230. Each ring gear 232 is used as an output simultaneously, allowing the system to produce multiple distinct outputs from one input. The shifting mechanism can be modified so that given application-specific outputs can be turned on or off while the remaining outputs continue to operate. This embodiment is suitable for applications such as automation involving multiple conveyor belts 234 driven at different speeds from one constant input.

The transmission system is advantageous for a number of reasons. The transmission system is durable and reliable. Shifting is done in a protected, enclosed case, which protects the system from contamination from particulates and fluids, such as dirt or water. Maintenance is minimized. Also the case protects the system from impact damage, for example, from objects on a bicycle trail such as rocks or trees if the transmission is used on a bicycle. The transmission system is particularly suitable for the demanding requirements of downhill mountain bicycles, which have been developed specifically to handle common downhill riding with trail features including large rocks and boulders, rock gardens, dust, snow, rain, mud, roots, jumps, drop-offs of over ten vertical feet, gap jumps of over 35 feet, and high speeds.

The invention is not to be limited by what has been particularly shown and described, except as indicated by the appended claims.

What is claimed is:

1. A sequential planetary stack transmission system comprising:
    a planetary stack assembly comprising:
    a rotatable hollow central shaft defining a central axis;
    a stack of planetary gear sets, each gear set defining an input/output gear ratio, each gear set comprising:
        a sun gear engageable with the central shaft for rotation with the central shaft concentrically about the central axis, and freely rotatable concentrically about the central shaft when not engaged with the central shaft,
        a plurality of planet gears engaged with the sun gear, and
        a ring gear engaged with the planet gears and rotatable concentrically about the central shaft; and the ring gears of the stack of planetary gear sets forming a ring gear barrel rotatable as a unit concentrically with respect to the central shaft;
    a shifting assembly disposed within the hollow central shaft and translatable along the central axis, the shifting assembly engageable sequentially with the sun gears; and
    a case, the planetary stack assembly and the shifting assembly disposed within the case, the case including apertures for connection of the planetary stack assembly to an input and an output.

2. The system of claim 1, further comprising a support plate associated with each planetary gear set, the support plates fixed to the case, the sun gear and the planet gears supported for rotation on the associated support plate.

3. The system of claim 2, wherein the case comprises a main body and two opposed end plates, the support plates fixed to the end plates.

4. The system of claim 1, wherein the case comprises a main body and two opposed end plates, the ring gear barrel rotatably mounted via bearings on the end plates.

5. The system of claim 1, wherein the case comprises a main body and two opposed end plates.

6. The system of claim 1, wherein the ring gear barrel is comprised of an integral piece.

7. The system of claim 1, wherein the ring gear barrel is comprised of a plurality of ring gears fastened together.

8. The system of claim 1, wherein the ring gear barrel is coupled directly to the input or the output.

9. The system of claim 1, wherein the ring gear barrel further includes external teeth engaged with a reversal gear mounted to the case for rotation about an axis spaced from the central axis of the central shaft, wherein the reversal gear is rotatable in the same direction as the central shaft.

10. The system of claim 1, wherein the shifting assembly further includes a pawl or a set of pawls associated with each gear set and disposed within recesses in the central shaft for engagement with an associated sun gear, the pawls actuatable to engage the associated sun gear.

11. The system of claim 10, further comprising a biasing mechanism biasing the pawls radially into the recesses unless actuated.

12. The system of claim 10, further comprising a shifting element movable through the pawl or set of pawls.

13. The system of claim 12, wherein the shifting element comprises a shifting bulb including actuating members therein biased radially outwardly to contact an adjacent pawl.

14. The system of claim 12, wherein the shifting assembly further includes a cable attached between the shifting element and a shifter, movement of the cable effecting movement of the shifting element through the central shaft.

15. The system of claim 14, further comprising a shifting scalar mechanism to scale up the length of movement of the cable.

16. The system of claim 15, wherein the shifting scalar mechanism comprises a pulley comprising a smaller diameter wheel attached to a cable from the shifter and a larger diameter wheel attached to the cable to the shifting element.

17. The system of claim 14, further comprising a return biasing member attached to the shifting element.

18. The system of claim 10, wherein the pawls are electromagnetically actuatable.

19. The system of claim 1, further comprising an additional planetary reversal gear set.

20. The system of claim 1, wherein the ring gear barrel is fixed to the case, and the planet gears are supported by support plates rotatable as a unit concentrically with respect to the central shaft.

21. The system of claim 1, wherein the central shaft is coupled to bicycle pedals, and the ring gear barrel is coupled to a rear wheel of a bicycle.

22. The system of claim 1, wherein the case includes a bottom bracket attachable to a bicycle frame.

23. The system of claim 1, wherein the planetary stack assembly is coupled to vanes of a windmill.

24. The system of claim 1, wherein the planetary stack assembly is coupled to a drill press.

25. The system of claim 1, wherein the ring gear barrel is coupled to multiple outputs.

26. The system of claim 25, wherein the shifting assembly is operable to select multiple gear sets.

* * * * *

UNITED STATES PATENT AND TRADEMARK OFFICE
CERTIFICATE OF CORRECTION

PATENT NO.       : 8,449,427 B2                                       Page 1 of 1
APPLICATION NO. : 12/745841
DATED            : May 28, 2013
INVENTOR(S)      : Witonis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 289 days.

Signed and Sealed this
Eighth Day of September, 2015

Michelle K. Lee
*Director of the United States Patent and Trademark Office*